(12) United States Patent
Yamasaki

(10) Patent No.: US 11,467,898 B2
(45) Date of Patent: Oct. 11, 2022

(54) INFORMATION PROCESSING APPARATUS AND METHOD OF CONTROLLING THE SAME

(71) Applicant: CANON KABUSHIKI KAISHA, Tokyo (JP)

(72) Inventor: Shozo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 16/837,331

(22) Filed: Apr. 1, 2020

(65) Prior Publication Data
US 2020/0319955 A1 Oct. 8, 2020

(30) Foreign Application Priority Data

Apr. 5, 2019 (JP) .............................. JP2019-073077

(51) Int. Cl.
*G06F 11/00* (2006.01)
*G06F 11/07* (2006.01)
*G06F 11/22* (2006.01)

(52) U.S. Cl.
CPC ...... *G06F 11/0793* (2013.01); *G06F 11/0721* (2013.01); *G06F 11/0751* (2013.01); *G06F 11/2284* (2013.01)

(58) Field of Classification Search
CPC ............. G06F 11/0793; G06F 11/0721; G06F 11/2284; G06F 11/0751; G06F 11/073; G06F 11/0772; G06F 11/0733
USPC ...................................................... 714/1–57
See application file for complete search history.

(56) References Cited

U.S. PATENT DOCUMENTS

| | | | | |
|---|---|---|---|---|
| 7,734,945 B1* | 6/2010 | Levidow | ............. | G06F 11/0793 714/3 |
| 2007/0214386 A1* | 9/2007 | Watanabe | ........... | G06F 11/2284 714/13 |
| 2008/0229169 A1* | 9/2008 | Naritomi | ............. | G06F 11/1032 714/752 |
| 2009/0006890 A1* | 1/2009 | Takada | ................ | G06F 11/0724 714/5.11 |
| 2014/0173328 A1* | 6/2014 | Dasari | ................ | G06F 11/0736 714/2 |
| 2014/0189422 A1* | 7/2014 | Niwa | .................. | G06F 11/0778 714/6.23 |

(Continued)

FOREIGN PATENT DOCUMENTS

JP 2012174061 A 9/2012

*Primary Examiner* — Sarai E Butler
(74) *Attorney, Agent, or Firm* — Venable LLP

(57) ABSTRACT

An information processing apparatus includes a nonvolatile memory device in which a program for activating the apparatus is stored, and which has a function of, in a case where an abnormality of management information indicating a correspondence relationship between a logical address and a physical address for data stored in the memory device is detected, performing a process of restoring the an abnormality of the management information is detected at a time of activation of the memory device. In a case where activation of the apparatus based on the program stops part way through, the apparatus is reactivated. Different processes for solving a malfunction in which activation of the apparatus stops part way through are executed based on whether or not an abnormality of the management information is detected in the memory device after the reactivation.

13 Claims, 10 Drawing Sheets

(56) References Cited

U.S. PATENT DOCUMENTS

| | | | |
|---|---|---|---|
| 2014/0258699 A1* | 9/2014 | Hsu | G06F 11/0721 |
| | | | 713/2 |
| 2015/0089280 A1* | 3/2015 | Sade | G06F 11/0793 |
| | | | 714/6.12 |
| 2015/0131393 A1* | 5/2015 | Choo | G11C 29/78 |
| | | | 365/200 |
| 2015/0160994 A1* | 6/2015 | Niwa | G06F 11/0778 |
| | | | 714/19 |
| 2016/0147605 A1* | 5/2016 | Chen | G06F 11/1417 |
| | | | 714/15 |
| 2016/0342509 A1* | 11/2016 | Kotte | G06F 12/0246 |
| 2016/0378604 A1* | 12/2016 | Teshome | G06F 11/1417 |
| | | | 714/36 |
| 2017/0147455 A1* | 5/2017 | Sakuma | G06F 11/2046 |
| 2018/0246552 A1* | 8/2018 | Thompson | G06F 11/3093 |

* cited by examiner

F I G. 1
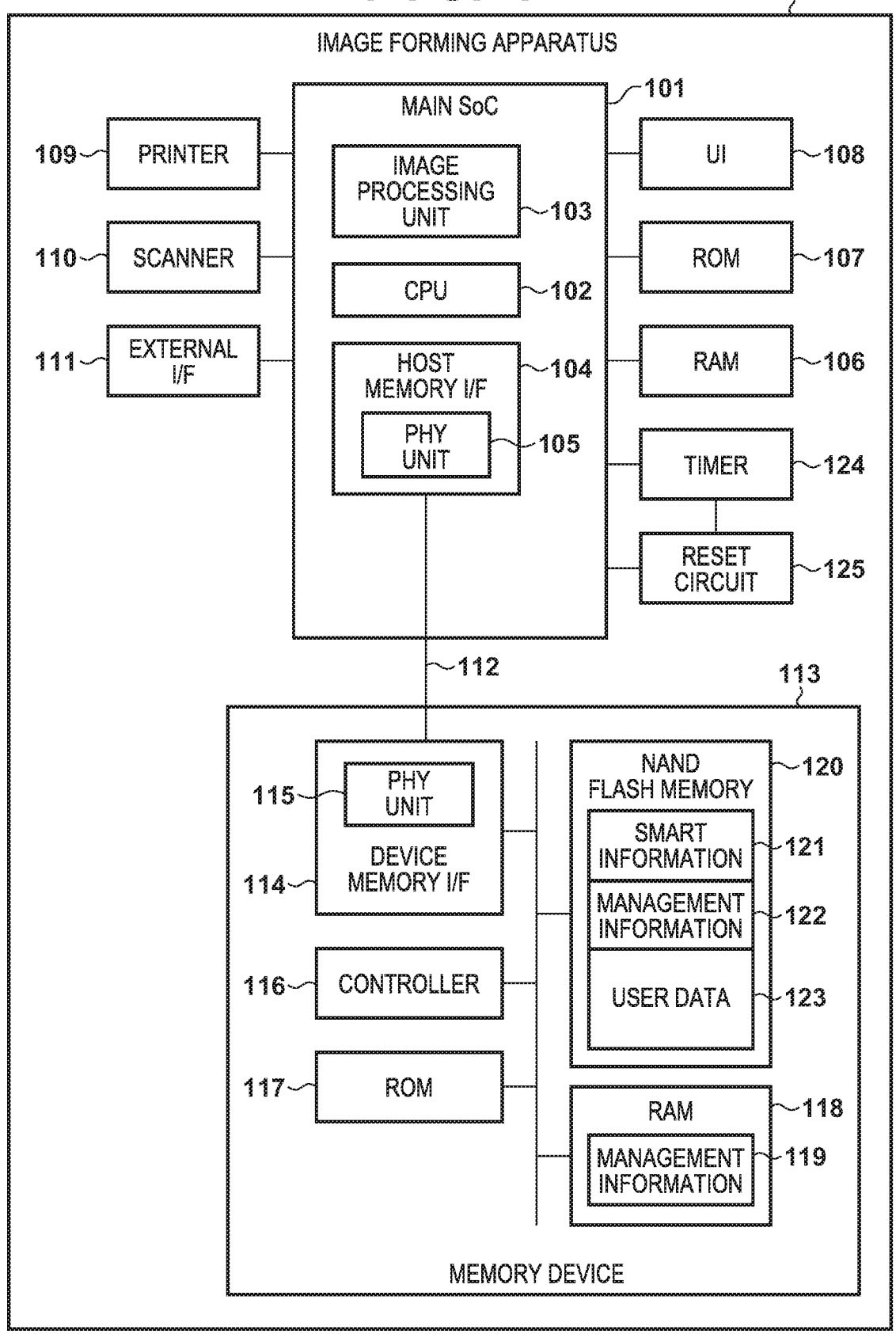

FIG. 2

PRIOR TO DATA UPDATE

| LOGICAL ADDRESS | PHYSICAL ADDRESS |
|---|---|
| 0 | 0 |
| 1 | 1 |
| 2 | 2 |
| 3 | 3 |
| 4 | 4 |
| ⋮ | ⋮ |

AFTER DATA UPDATE

| LOGICAL ADDRESS | PHYSICAL ADDRESS |
|---|---|
| 0 | 0 |
| 1 | 5 |
| 2 | 2 |
| 3 | 6 |
| 4 | 4 |
| ⋮ | ⋮ |

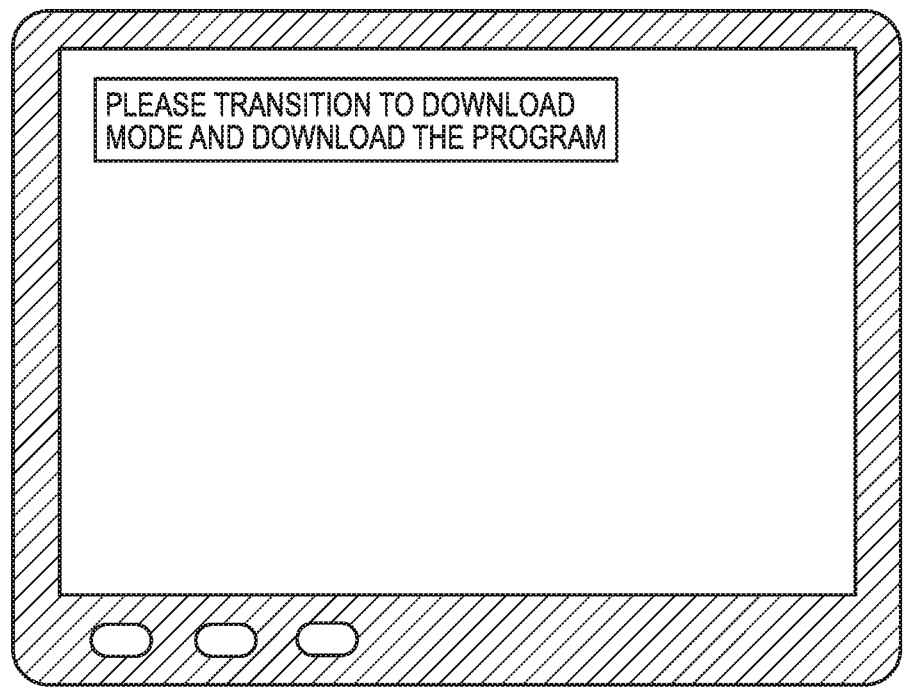
F I G. 8

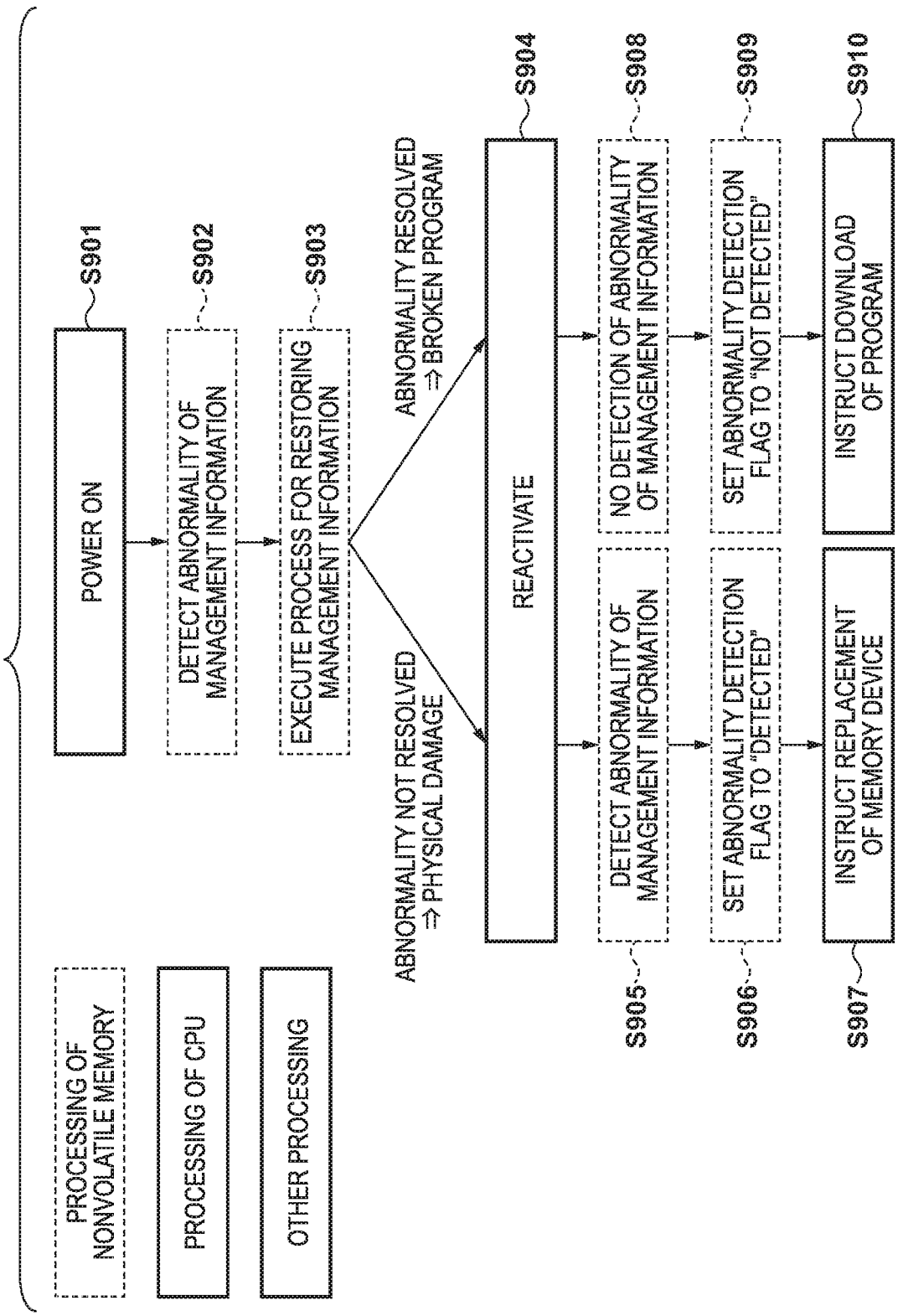

INFORMATION PROCESSING APPARATUS AND METHOD OF CONTROLLING THE SAME

BACKGROUND OF THE INVENTION

Field of the Invention

The present invention relates to an information processing apparatus provided with a nonvolatile memory device and a method of controlling the same.

Description of the Related Art

Conventionally, there has been known a technique for reducing the work load of a service person by error notification when an apparatus detects an occurrence of an error in connection with processing for recovery of the apparatus by the service person. In addition, with respect to an apparatus which is activated by executing a program written in a nonvolatile memory device, a technique of reactivating the apparatus or downloading the program when the apparatus cannot be normally activated has been known (for example, Japanese Patent Laid-Open No. 2012-174061).

As described above, one reason for a malfunction in which an apparatus cannot be activated is that a program written in the nonvolatile memory device is broken, and another is that the circuit inside the device is physically damaged. If the program is broken, the malfunction can be solved by downloading the program again. However, when the device is physically damaged, even if the program is downloaded again, the malfunction cannot be solved, and replacement of the device is necessary. Therefore, if the program is downloaded to a physically damaged nonvolatile memory device, the time required for the download is wasted.

SUMMARY OF THE INVENTION

The present invention was conceived in view of the above described problems, and provides a technique by which it is possible to appropriately deal with a malfunction in which an information processing apparatus cannot be normally activated.

According to one aspect of the present invention, there is provided an information processing apparatus, comprising: a nonvolatile memory device in which a program for activating the information processing apparatus is stored, the memory device having a function of, in a case where an abnormality of management information indicating a correspondence relationship between a logical address and a physical address for data stored in the memory device is detected, performing a process of restoring the an abnormality of the management information is detected at a time of activation of the memory device; a reactivation unit configured to, in a case where activation of the information processing apparatus based on the program stops part way through, reactivate the information processing apparatus; and a processing unit configured to execute different processes for solving a malfunction in which activation of the information processing apparatus stops part way through, based on whether or not an abnormality of the management information is detected in the memory device after the reactivation by the reactivation unit.

According to another aspect of the present invention, there is provided an information processing apparatus, comprising: a nonvolatile memory device in which a program for activating the information processing apparatus is stored, the memory device having a function of, when an abnormality of management information that indicates a correspondence relationship between a logical address and a physical address for data stored in the memory device is detected, performing a process of restoring the management information; and a processing unit configured to, in a case where activation of the information processing apparatus based on the program stops part way through, cause the memory device to execute the function, and in a case where an abnormality of the management information is not detected in execution of the function based on the stoppage, prompt downloading of the program from an external apparatus or download of the program from an external apparatus.

According to still another aspect of the present invention, there is provided a method of controlling an information processing apparatus that comprises a nonvolatile memory device in which a program for activating the information processing apparatus is stored, the memory device having a function of, in a case where an abnormality of management information indicating a correspondence relationship between a logical address and a physical address for data stored in the memory device is detected, performing a process of restoring the an abnormality of the management information is detected at a time of activation of the memory device, the method comprising: in a case where activation of the information processing apparatus based on the program stops part way through, reactivating the information processing apparatus; and executing different processes for solving a malfunction in which activation of the information processing apparatus stops part way through, based on whether or not an abnormality of the management information is detected in the memory device after the reactivation.

Further features of the present invention will become apparent from the following description of exemplary embodiments (with reference to the attached drawings).

BRIEF DESCRIPTION OF THE DRAWINGS

FIG. 1 is a block diagram illustrating an example of a hardware configuration of an image forming apparatus.

FIG. 2 illustrates an example of management information of a memory device.

FIG. 8 illustrates an example of an operation screen displayed on the UI of the image forming apparatus.

FIG. 9 is a flowchart illustrating an outline of the embodiment.

DESCRIPTION OF THE EMBODIMENTS

Figure 3:
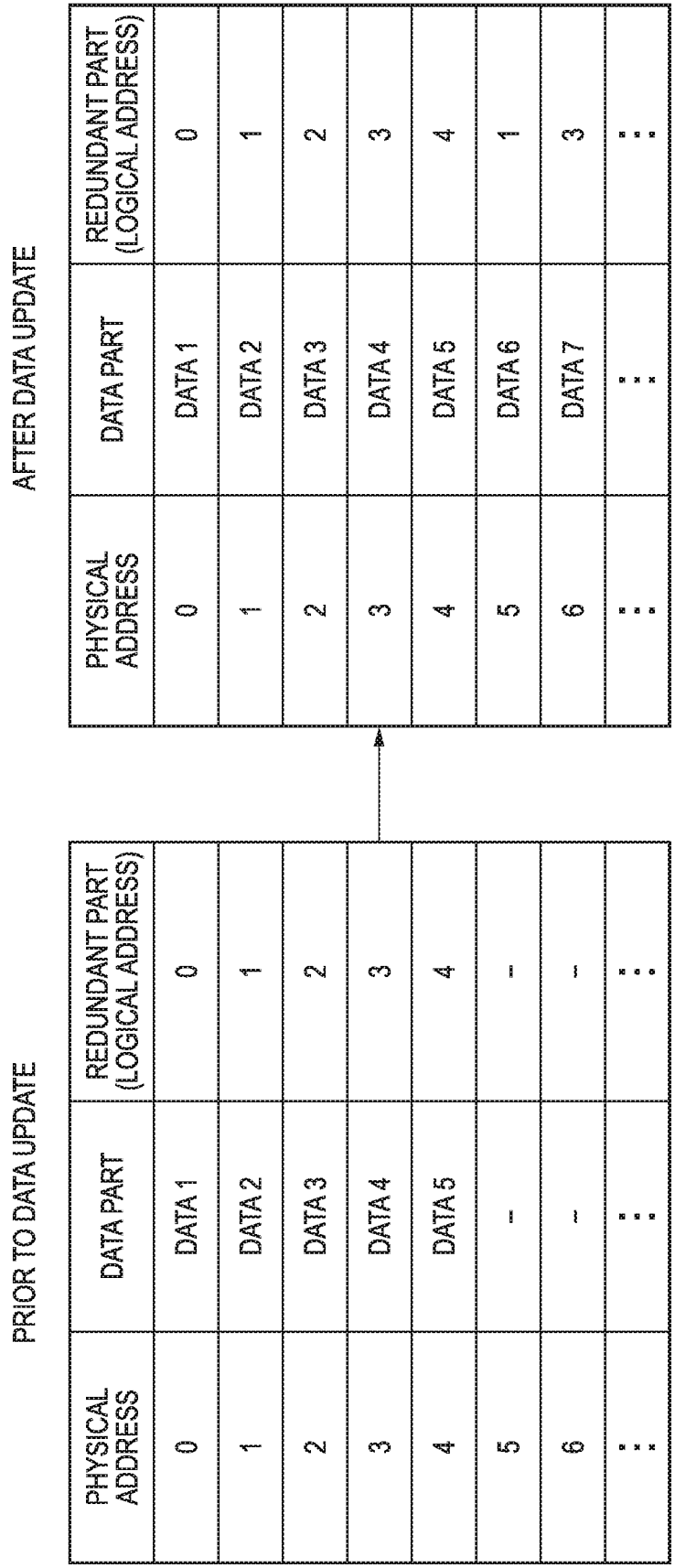
FIG. 3 illustrates an exemplary configuration of memory blocks of a NAND flash memory.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the first embodiment, an example will be described in which a cause of a malfunction in which control to activate an information processing apparatus is stopped part way through is determined based on whether or not an abnormality in management information of a nonvolatile memory device is detected after a reactivation performed during the execution of the activation control. In addition, an example will be described in which, in the information processing apparatus, processing is performed in accordance with a result of determination of the cause of the malfunction in which the activation control is stopped part way through.

First, with reference to FIG. 9, a description will be given of an outline of processing for determining a cause of a malfunction in an information processing apparatus according to the present embodiment in a case where a malfunction occurs in which activation control based on a program stored in a nonvolatile memory device stops part way through. In FIG. 9, broken line blocks indicate processing by a controller incorporated in the nonvolatile memory device which is mounted in the information processing apparatus. Solid-line blocks indicate processing by a CPU that controls the information processing apparatus in which the nonvolatile memory device is mounted. Double-lined blocks indicate processing by other devices.

The CPU initiates control for activating of the apparatus by executing a program stored in the nonvolatile memory device when the apparatus is powered on. When the power of the device is turned on (step S901), the nonvolatile memory device (controller) checks whether or not there is an abnormality in management information held therein (step S902), and when an abnormality is detected, executes processing to restore the management information (step S903). If, as a result of the restoration processing, the abnormality of the management information is not resolved, it is determined that physical damage to the nonvolatile memory device has occurred, and if the abnormality of the management information is resolved, it is determined that the program stored in the nonvolatile memory device is broken. In the present embodiment, this determination is made to be executable by the CPU.

At the point in time when the execution of the restoration processing is completed, the CPU cannot perform the above-described determination because the control to activate the apparatus is stopped part way through. Therefore, the device is reactivated (step S904) in order to enable the determination by the CPU. When the apparatus is reactivated, the following processing is performed by the CPU and the nonvolatile memory device (controller).

When the nonvolatile memory device detects an abnormality in the management information (step S905), the nonvolatile memory device sets an abnormality detection flag to "detected" in order to enable the CPU to make the determination. When the abnormality detection flag read from the nonvolatile memory device indicates that an abnormality was detected in the management information, the CPU determines that the physical damage occurred to the memory device, and instructs that the memory device be replaced (step S907).

On the other hand, when no abnormality is detected in the management information (step S908), the nonvolatile memory device sets an abnormality detection flag to "not detected" in order to enable the CPU to make the determination. When the abnormality detection flag read from the nonvolatile memory device indicates that an abnormality was not detected in the management information, the CPU determines that the program stored in the memory device is broken, and instructs that the program to be downloaded (step S910).

In this manner, the information processing apparatus according to the present embodiment determines the cause of the stoppage part way through the control to activate the apparatus, and performs processing according to the determination result. Hereinafter, the present embodiment will be described in detail with reference to FIGS. 1 to 8.

<Image Forming Apparatus>

FIG. 1 is a block diagram illustrating a configuration example of an image forming apparatus 100 according to the present embodiment. In the present embodiment, an example in which the image forming apparatus 100 is a control apparatus of a nonvolatile memory device will be described. A memory device 113 of FIG. 1 is a nonvolatile memory device used in the image forming apparatus 100, and is assumed to be an SATA FLASH device including an SATA I/F. The nonvolatile memory device is not limited to an SATA FLASH device, and may be a memory device such as an SSD, a USB FLASH device, an eMMC (embedded Multi Media Card), or a UFS (Universal Flash Storage), for example.

The image forming apparatus 100 includes a main SoC (system-on-chip) 101, a RAM 106, a ROM 107, a user interface (UI) 108, a printer 109, a scanner 110, an external interface (I/F) 111, a memory device 113, a timer 124, and a reset circuit 125.

The main SoC 101 is an integrated circuit component and includes a CPU 102, an image processing unit 103, and a host memory I/F 104. Although not illustrated in FIG. 1, the main SoC 101 also includes control interfaces for devices such as the RAM 106, the ROM 107, the UI 108, and a system bus connecting these.

The CPU 102 is a central processing unit for controlling the entire image forming apparatus 100. An image processing unit 103 performs image processing such as correction, processing, and editing on the input image data read from the scanner 110. The image processing unit 103 performs image processing such as color conversion, filter processing, and resolution conversion on the output image data to be output to the printer 109.

The host memory I/F 104 is a memory interface including a DMAC (Direct Memory Access Controller) (not illustrated) and a PHY unit 105. The PHY unit 105 is a unit that processes physical layers in SATA communication, and transmits and receives logical signals. When the CPU 102 controls the host memory I/F 104, data can be input/output between the memory device 113 and the RAM 106 via an SATA I/F 112. The SATA I/F 112 is an interface of an SATA standard, and communicably connects the CPU 102 as a host and the controller 116 of the memory device 113 as a device.

The RAM 106 is a system work memory for operation of the CPU 102, and stores calculation data of the CPU 102 and various programs. Programs stored in the RAM 106 are stored in the ROM 107 or the memory device 113 in advance, and are loaded into the RAM 106 by the CPU 102 when the image forming apparatus 100 is powered on. The RAM 106 is also used as an image memory for holding image data subjected to image processing by the image processing unit 103 when scanning or printing is performed.

The ROM 107 is a boot ROM and stores a boot program of the image forming apparatus 100.

The UI 108 comprises a liquid crystal display, a touch panel, hard keys, and the like so that the user can recognize and enter information. The printer 109 is a printer engine that prints an image on a sheet based on image data. The scanner 110 reads (scans) an image of an original sheet with a reading sensor such as a CCD or a CIS sensor to generate image data. The external I/F 111 is an interface to a communication network such as a telephone line network, a wired LAN, or a wireless LAN, and an interface to an external device such as a USB device. The CPU 102 performs data communication with an external apparatus via the external I/F 111.

The reset circuit 125 outputs a reset signal to the CPU 102. The CPU 102 continues a reset state while the reset signal outputted from the reset circuit 125 is at a low level after the power supply to the main SoC 101 is started when the power supply of the image forming apparatus 100 is turned on. The reset state of the CPU 102 is cancelled by switching the reset signal output from the reset circuit 125 from the low level to the high level after a predetermined period of time (e.g., 100 ms) has elapsed since the power supply to the reset circuit 125 was started. The low level reset signal is outputted from the reset circuit 125 when the power supply to the reset circuit 125 is stopped and the supply voltage falls below a predetermined level (for example, when the supply voltage drops from 3.3V to 2.9V). Alternatively, the output of the low-level reset signal from the reset circuit 125 is performed in response to the reception of a reset drive signal output from the timer 124.

The timer 124 has a function of performing reboot control in a case where control to activate the image forming apparatus 100 executed by the CPU 102 using a program stored in the memory device 113 is detected to have stopped. In the present embodiment, the timer 124 performs the reboot control by outputting a reset drive signal to the reset circuit 125 when detecting that the activation control stopped.

Specifically, the CPU 102 turns on an enable signal supplied to the timer 124 prior to starting the control to activate the image forming apparatus 100 using the program stored in the memory device 113, thereby starting the timer-count by the timer 124. Thereafter, when the activation control is terminated before the elapse of a predetermined time (before the timer 124 times out), the CPU 102 can stop the timer 124 by turning off the enable signal supplied to the timer 124.

If the activation control by the CPU 102 is stopped due to a malfunction of the program read from the memory device 113, the CPU 102 cannot stop the timer 124 prior to the elapse of the predetermined time. As a result, the timer 124 times out. When it times out, the timer 124 outputs a reset drive signal to the reset circuit 125. As a result, the reboot control is started. In the reboot control, the boot program stored in the ROM 107 is executed again by the CPU 102. Thereby, the same activation control as the activation control executed when the power of the image forming apparatus 100 is turned on is started. Incidentally, the malfunctioning of a program read out from the memory device 113 may be caused by the program, stored previously in the memory device 113, itself being broken, or may be caused by physical damage to the memory device 113.

The timer 124 may have a function of performing reboot control when the CPU 102 stops the activation control part way through. For example, the timer 124 may be a watchdog timer or the like in which the timer-count is cleared from the CPU 102 every predetermined time period, and may output a reset drive signal to the reset circuit 125 to drive the reset circuit 125 at point in time when the timer count from the CPU 102 is not cleared.

Prior to turning on the enable signal supplied to the timer 124, the CPU 102 sets an activation control in progress flag included in user data 123 stored in the memory device 113 to a value (in this example, "1") indicating that the activation control is being executed. The CPU 102 clears the activation control in progress flag after turning off the enable signal supplied to the timer 124. Specifically, the CPU 102 sets the activation control in progress flag to a value (in this example, "0") indicating that the activation control is not being executed.

When the boot program is executed, the CPU 102 can read the activation control in progress flag from the user data 123 stored in the memory device 113. At this time, when the read activation control in progress flag is set to "0", the CPU 102 determines that the previous activation control has ended normally. When the read activation control in progress flag is set to "1", the CPU 102 determines that the previous activation control did not terminate normally (i.e., it stopped part way through) and the reboot control according to the timer 124 is performed.

<Memory Device (SATA FLASH Device)>

As illustrated in FIG. 1, the memory device 113 includes a device memory I/F 114, a controller 116, a ROM 117, a RAM 118, and a NAND flash memory 120.

The device memory I/F 114 is an interface for inputting/outputting data between the main SoC 101 and the controller 116 under the control of the controller 116. The PHY unit 115 incorporated in the device memory I/F 114 is a unit for performing a physical layer process in SATA communication similar to that of the PHY unit 105. The controller 116 is a memory control module that interprets commands received from the CPU 102 of the main SoC 101 via the device memory I/F 114 and performs operations in accordance with the interpreted commands.

The ROM 117 is a nonvolatile storage area in which firmware of the memory device 113 is stored, the firmware being set by the device manufacturer. The RAM 118 is a cache memory in which data is temporarily stored when the controller 116 writes or reads data to or from the NAND flash memory 120. The RAM 118 has a role of storing the latest management information 119.

NAND flash memory 120 is controlled by the controller 116. SMART (Self-Monitoring, Analysis and Reporting Technology) information 121, management information 122, and user data 123 are stored in the NAND flash memory 120. The user data 123 includes a program for the CPU 102 to activate the image forming apparatus 100, and data such as setting data.

The SMART information 121 is data used by the controller 116 to determine a fault state of the memory device 113. In the SMART information 121, data of items such as the number of defective blocks and the number of clears of the NAND flash memory 120 that can be used for determining the fault state is recorded. An abnormality detection flag, which will be described later, is also recorded in the SMART information 121. The CPU 102 can read the data of respective items recorded in the SMART information 121 from the NAND flash memory 120.

The management information 122 includes an address conversion table that associates a physical address in the NAND flash memory 120 and a logical address specified by the CPU 102. FIG. 2 illustrates an example of an address conversion table included in the management information 122. The address conversion table is configured, for example, in units of memory blocks of the NAND flash memory 120. The management information 122 is loaded from NAND flash memory 120 into the RAM 118 when the memory device 113 is powered on. The controller 116 converts a logical address specified by the CPU 102 into a corresponding physical address based on the management information 122 loaded into the RAM 118. In addition, the controller 116 uses the physical addresses to write and read data to and from NAND flash memory 120.

NAND flash memory 120 is structurally unable to overwrite a region of physical addresses in which data has been written and is valid at the time of data updating. Therefore, at the time of updating the data, the data is written to a new physical address region in which the writing has not been performed or a region of cleared physical addresses. Further, as illustrated in FIG. 2, a physical address associated with a logical address of the management information 119 held in the RAM 118 is changed to the physical address corresponding to a region in which data has been written. Therefore, as illustrated in FIG. 2, a physical address where data corresponding to a certain logical address exists is not fixed, but is changed in the address space of the NAND flash memory 120 every time the data is updated.

FIG. 2 illustrates that the data of the logical addresses 1 and 3 are updated and the physical addresses corresponding to the respective data are changed. As described above, the management information 119 held in the RAM 118 is updated in conjunction with data being written to the NAND flash memory 120.

As described above, the RAM 118 retains the latest management information 119. On the other hand, the management information 122 stored in the NAND flash memory 120 is not necessarily updated to the latest management information (i.e., the management information 119 stored in the RAM 118). In other words, NAND flash memory 120 may store management information that is not the latest management information. In this instance, a mismatch occurs between the management information 119 held in the RAM 118 and the management information 122 stored in the NAND flash memory 120.

FIG. 3 illustrates an exemplary configuration of memory blocks of the NAND flash memory 120. Each memory block is divided into a plurality of pages. FIG. 3 illustrates the physical address of each page and the data stored in each page. One page is made up of 528 bytes, of which 512 bytes are used as the data part and the remaining 16 bytes are used as a redundant part. User data is written in the data part of each page. An error correction code, management information, and the like are written in the redundant part. The management information written in the redundant part includes a logical address corresponding to the physical address of the region in which the user data is written.

FIG. 3 illustrates a change in the state of the memory blocks of the NAND flash memory 120 when data are updated for the logical addresses 1 and 3 as illustrated in FIG. 2. By updating the data, the updated data 6 and data 7 are written in the regions (pages) of the physical addresses 5 and 6, and the logical addresses 1 and 3 are written in the redundant parts of these regions.

<Example of Management Information Abnormality>

Next, an example in which an abnormality in the above-described management information 119 and 122 occurs due to an abnormal power-off of the image forming apparatus 100 will be described. In the present embodiment, the above-described management information 119 and 122 is an example of management information indicating a correspondence relationship between a logical address and a physical address for data stored in the memory device 113.

First, the operation of the memory device 113 in a case where normal power-off is performed in the image forming apparatus 100 will be described. When normal power-off is performed, the controller 116 updates the management information 122 stored in the NAND flash memory 120 to the latest management information by writing the management information 119 of the RAM 118 to the NAND flash memory 120. In this case, no inconsistency occurs between the management information 119 and the management information 122. At the next power-on of the memory device 113, the controller 116 can load the latest management information stored in the NAND flash memory 120 into the RAM 118.

Next, operation of the memory device 113 when, rather than the above-described normal power-off, an abnormal power-off occurs due to an instantaneous interruption to the power of the image forming apparatus 100, an electrical outage, or the like will be described. When an abnormal power disconnection occurs, the power supply to the memory device 113 is stopped without the management information 119 of the RAM 118 being written to the NAND flash memory 120. If a mismatch occurs between the management information 119 and the management information 122 due to writing of data to the NAND flash memory 120 prior to such an abnormal power-off, the power supply ends up being stopped without the management information 122 being updated to the latest management information. As a result, the management information 122 stored in the NAND flash memory 120 ends up in an abnormal state. Specifically, there is an abnormality in the address conversion table included in the management information 122 (i.e., the correspondence between the physical addresses and the logical addresses of the data stored in the NAND flash memory 120).

When the memory device 113 is powered on the next time, the management information 122 prior to the data update (i.e., management information in which there is an abnormality in the address conversion table) is loaded into the RAM 118 as the management information 119 from the NAND flash memory 120. In this state, the controller 116 cannot convert a logical address specified by the CPU 102 into a correct physical address based on the management information 119. Therefore, the CPU 102 cannot read the data written in the NAND flash memory 120 prior to power-off.

In order to avoid the above-described situation, the controller 116 compares the management information 119 loaded into the RAM 118 at the time of power-on with the data written in the NAND flash memory 120, and determines whether or not the management information 119 is abnormal. The controller 116 determines whether or not the content of the management information 119 corresponds to the data of the NAND flash memory 120 and, if not, determines that there is an abnormality in the management information 119.

For example, the controller 116 determines whether or not each logical address in the address conversion table included in the management information 119 matches the logical address written in the redundant part of the region (page) of the physical address associated with each logical address. In a case where there is an inconsistent logical address (that is, in a case where there is an abnormality in the correspondence between the logical addresses and the physical addresses in the address conversion table), the CPU 102 determines that there is an abnormality in the management information 119. In the case of an abnormal power-off as described above, an abnormality may occur in the correspondence relationship between the logical addresses and the physical addresses in the address conversion table.

When the controller 116 detects an abnormality in the management information 119 held in the RAM 118, it attempts to restore the management information. The process for restoring the management information 119 is, for example, a process of assigning a correct physical address to a logical address for which there is an abnormality in the address conversion table. However, other restoration processing may be used as long as the processing can resolve the abnormality of the management information.

In the present embodiment, when the process for restoring the management information 119 is executed, the controller 116 sets the abnormality detection flag, which is included in the SMART information 121 of the memory device 113 and indicates whether or not there is an abnormality in the management information, to a value indicating an abnormality ("1" in this example). In the present embodiment, the abnormality detection flag is an example of detection information indicating whether or not an abnormality of the management information 119 has been detected. The memory device 113 stores an abnormality detection flag as detection information that indicates whether or not an abnormality of the management information 119 has been detected at the time of activating the memory device. The abnormality detection flag is recorded in the SMART information 121 stored in the memory device. The CPU 102 refers to the abnormality detection flag stored in the memory device 113 (which is recorded in SMART information 121) to determine whether or not an abnormality in the management information 119 is detected after the image forming apparatus 100 is reactivated.

<Management Information Abnormality Detection Processing>

Figure 4:
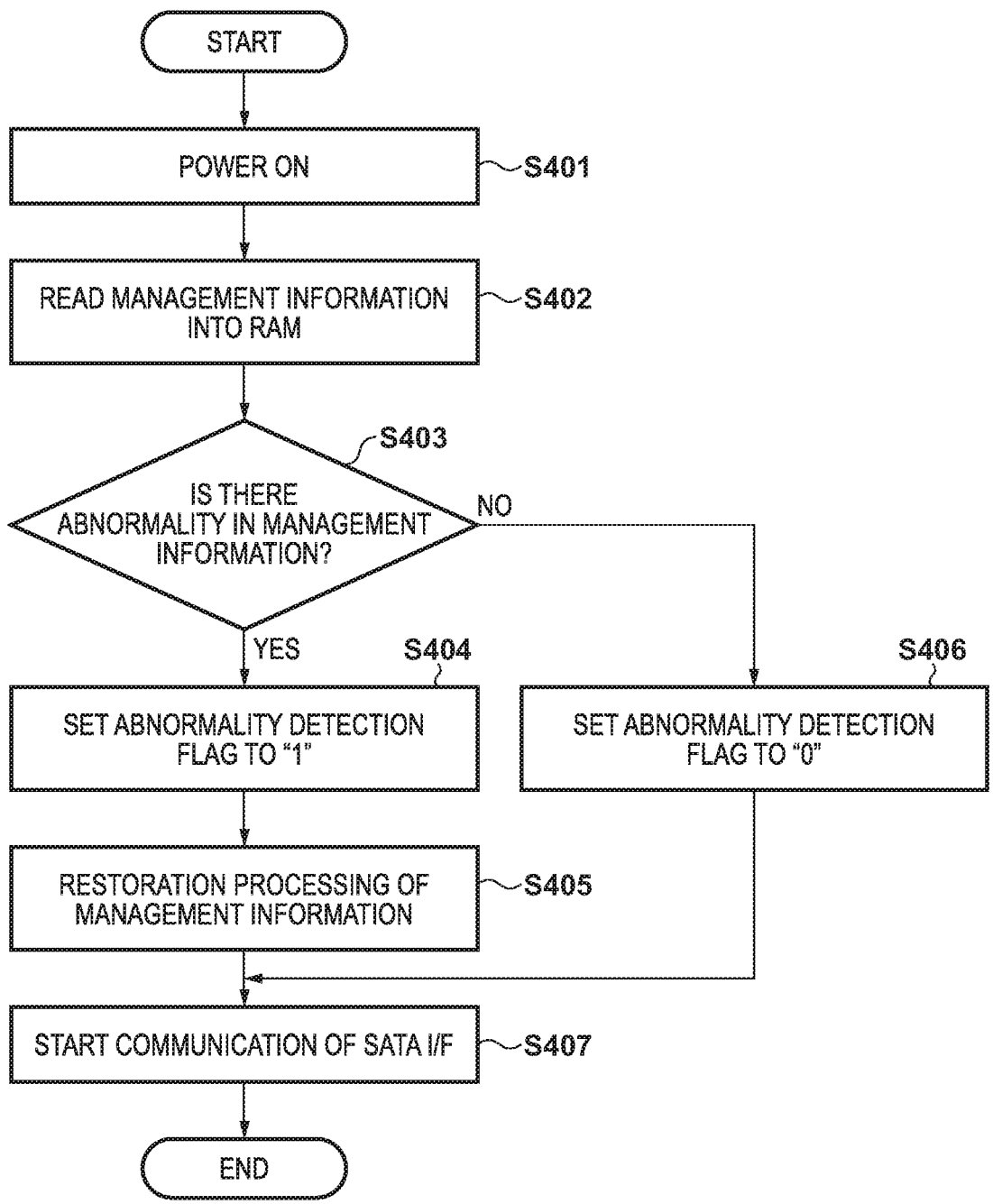
FIG. 4 is a flowchart illustrating a procedure of processing for detecting an abnormality in management information.

FIG. 4 is a flowchart illustrating a procedure of a process for detecting an abnormality in management information, which is executed by the controller 116 according to the present embodiment. The processing of the steps in FIG. 4 is realized by the controller 116 executing a program stored in the ROM 117 (or loaded from the ROM 117 into the RAM 118).

First, when the power of the memory device 113 is turned on in step S401, the controller 116 loads the management information 122 of the NAND flash memory 120 into RAM 118 as the management information 119 in step S402. Next, in step S403, the controller 116 compares the management information 119 read out to the RAM 118 with the data stored in the NAND flash memory 120, and determines whether or not the management information 119 is abnormal. The controller 116 advances the processing to step S404 when the management information has an abnormality (i.e., an abnormality has been detected) and advances the processing to step S406 when the management information has no abnormality.

In step S404, the controller 116 sets the abnormality detection flag that is included in SMART information 121 and indicates whether or not there is an abnormality in the management information to a value indicating an abnormality (that an abnormality was detected) ("1" in this example). Further, in step S405, the controller 116 attempts to restore the management information 119 by performing a process for restoring the management information 119 of the RAM 118. On the other hand, in step S406, the controller 116 sets the abnormality detection flag that is included in SMART information 121 and indicates whether or not there is an abnormality in the management information to a value indicating no abnormality (that an abnormality was not detected) ("0" in this example).

After the processing of step S405 or step S406, the controller 116, in step S407, receives an access from the CPU 102, initiates communication by the SATA I/F 112, and terminates the process. Incidentally, it is assumed that until the processing of step S401 to step S406 is completed, the controller 116 does not start communication by the SATA I/F 112 even if an access from the CPU 102 is received.

In this manner, when the power supply to the memory device 113 is started (that is, when the memory device 113 is activated), detection of an abnormality in management information and restoration processing is performed by the controller 116 in the memory device 113. Note that, the detection of an abnormality in the management information and the restoration processing described above are only examples, and any method can be applied as long as the abnormality in the management information can be detected and the management information can be restored.

<Processing when Activation Control is Stopped>

Next, an example in which activation control that is executed in the image forming apparatus 100 by the CPU 102 using a program (an activation program) stored in the memory device 113 is part way through will be described. First, a case where the memory device 113 is physically damaged will be described. For example, when there is physical damage to the NAND flash memory 120 or the RAM 118 comprising the memory device 113, data read from the NAND flash memory 120 or data stored in the RAM 118 may be abnormal.

For example, in a case where the damaged part pertains to the management information stored in the NAND flash memory 120 or the RAM 118, the abnormality in the management information 119 is detected by the controller 116 when the power of the memory device 113 is turned on. In response to the detection of the abnormality of the management information 119, the controller 116 sets the abnormality detection flag of the SMART information 121 to "1" and starts the process for restoring the management information 119 held in the RAM 118.

However, in a case where the memory device 113 is physically damaged, the controller 116 cannot restore the management information 119. In this instance, the controller 116 cannot read the desired data from the NAND flash memory 120 even when it receives an access from the CPU 102. As a result, the activation control of the image forming apparatus 100 by the CPU 102 stops. In this manner, in a case where the management information is not restored even though the above-described restoration processing is executed in response to the detection of an abnormality in the management information, it can be determined that the memory device 113 has been physically damaged.

Next, a procedure for the CPU 102 to determine whether the memory device 113 is physically damaged will be described.

In a case where the memory device 113 is physically damaged as described above, activation control based on a program stored in the memory device 113 stops when the image forming apparatus 100 is powered on. In this case, inside the memory device 113, the controller 116, in response to detection of the abnormality in the management information 119, sets the abnormality detection flag of the SMART information 121 to "1" and starts the restoration process of the management information 119, but it is impossible to restore the management information.

Meanwhile, as described above, the CPU 102 starts the timer 124 before starting the control for activating the image forming apparatus 100. However, when the activation control stops part way through, the CPU 102 cannot stop the timer 124. As a result, the timer 124 times out, and the reboot control is executed. After the reboot is performed, the CPU 102 reads the activation control in progress flag included in the user data 123 stored in the memory device 113 in the control for activating the image forming apparatus 100.

In a case where the read activation control in progress flag is set to a value indicating that the activation control is being executed (in this example, "1"), the CPU 102 reads out the abnormality detection flag from the SMART information 121 stored in the memory device 113 without continuing the normal activation control. Here, if the memory device 113 is not physically damaged, the management information is restored by the restoration process executed by the controller 116 before the reboot is performed. However, if the memory device 113 is physically damaged, the management information cannot be restored, and the abnormality detection flag is set to a value indicating there is an abnormality in the management information. For this reason, the CPU 102 reads out an abnormality detection flag set to a value indicating that there is an abnormality in the management information.

In this manner, the CPU 102 determines, based on the activation control in progress flag, that a reboot has been performed while the activation control at the time of power-on is being performed, and determines, based on the abnormality detection flag, that there is an abnormality in the management information 119. Based on these determination results, the CPU 102 can identify that the memory device 113 has been physically damaged.

When the memory device 113 is physically damaged, only by replacing the memory device 113 is it possible to solve the malfunction by which the image forming apparatus 100 cannot be started due to the damage to the memory device 113. The image forming apparatus 100 of the present embodiment has a configuration in which the memory device 113 can be replaced. For example, the memory device 113 comprises a replaceable substrate, and may be connected via a connector (not illustrated) to a substrate on which the main SoC 101 is mounted.

As described above, in a case where the memory device 113 is physically damaged, the control to activate the image forming apparatus 100 by the CPU 102 stops part way through. Such a stoppage of the activation control may occur not only when the memory device 113 is physically damaged, but also in a case where due to a program (activation program) included in the user data 123 that is stored in the memory device 113 being broken.

The program being broken as mentioned above occurs when, for example, the image forming apparatus 100 is abnormally powered off while the program is part way through being downloaded from an external device (external apparatus) for the purpose of upgrading the software of the image forming apparatus 100. If downloading of a program is interrupted part way through due to such an abnormal power-off, the program written in the memory device 113 is incomplete, and so the CPU 102 cannot normally perform activation control.

As described above, in the memory device 113, both when the program is broken and when there is physical damage, the activation control based on the program stored in the memory device 113 stops. Hereinafter, the difference between the program being broken and the physical damage of the memory device 113 will be further described.

In a case where the memory device 113 is physically damaged, an abnormality of the management information is detected when the memory device 113 is powered on, but the abnormality of the management information cannot be restored by the above-described restoration processing. Meanwhile, in a case where the program is broken, even if an abnormality of the management information is detected when the memory device 113 is powered on, the abnormality of the management information can be restored by the restoration processing. This is because the abnormality in the management information is caused by the occurrence of an abnormal power-off of the image forming apparatus 100 during the updating of the data in NAND flash memory 120 accompanying the downloading of the program. In this case, the management information can be restored by a predetermined restoration process as described above.

However, when the restoration of the management information is completed, while the abnormality in the management information is not detected at the time of subsequent power-on, the fact that the program stored in the memory device 113 is broken is not resolved. Therefore, the CPU 102 cannot start the image forming apparatus 100 normally using that program, and the activation control stops part way through.

Therefore, in the present embodiment, when it is determined that a reboot was performed during the execution of activation control at the time of power-on based on the activation control in progress flag described above, the CPU 102 determines whether or not an abnormality in the management information 119 has been detected based on the abnormality detection flag. In a case where an abnormality of the management information 119 was not detected (that is, an abnormality of the management information 119 was resolved by the restoration process), the CPU 102 identifies the program stored in the memory device 113 being broken as a cause of the inability to perform the activation control normally.

As described above, when the program stored in the memory device 113 is broken, the broken program can be restored by downloading the program from the external device to the image forming apparatus 100 again. In this case, it is not necessary to replace the memory device 113.

<Process for Determining a Malfunction in Activation Control>

Figure 5A:
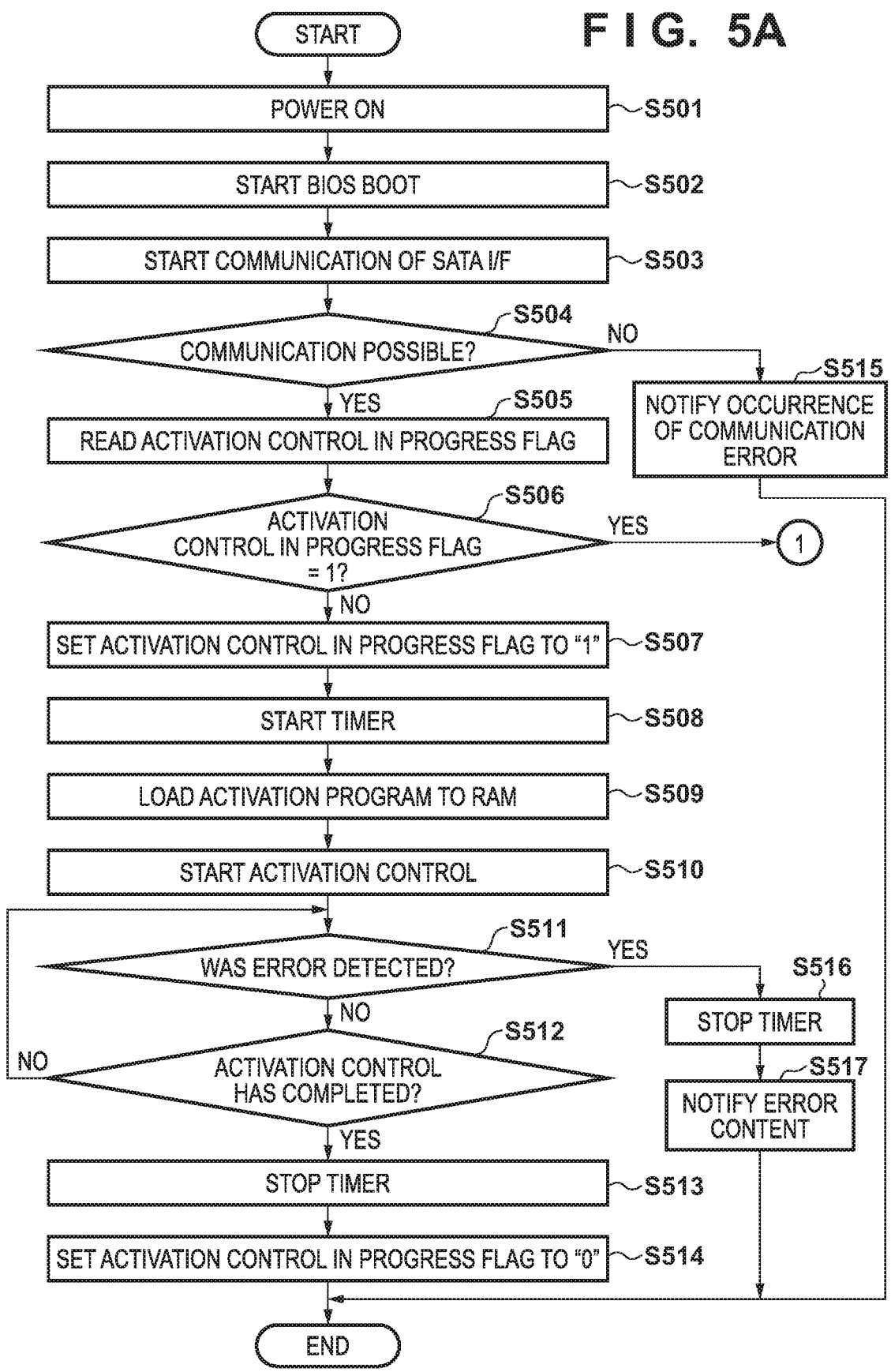
FIGS. 5A and 5B are flowcharts illustrating a procedure of processing for determining a cause of a malfunction in activation control.
Figure 5B:
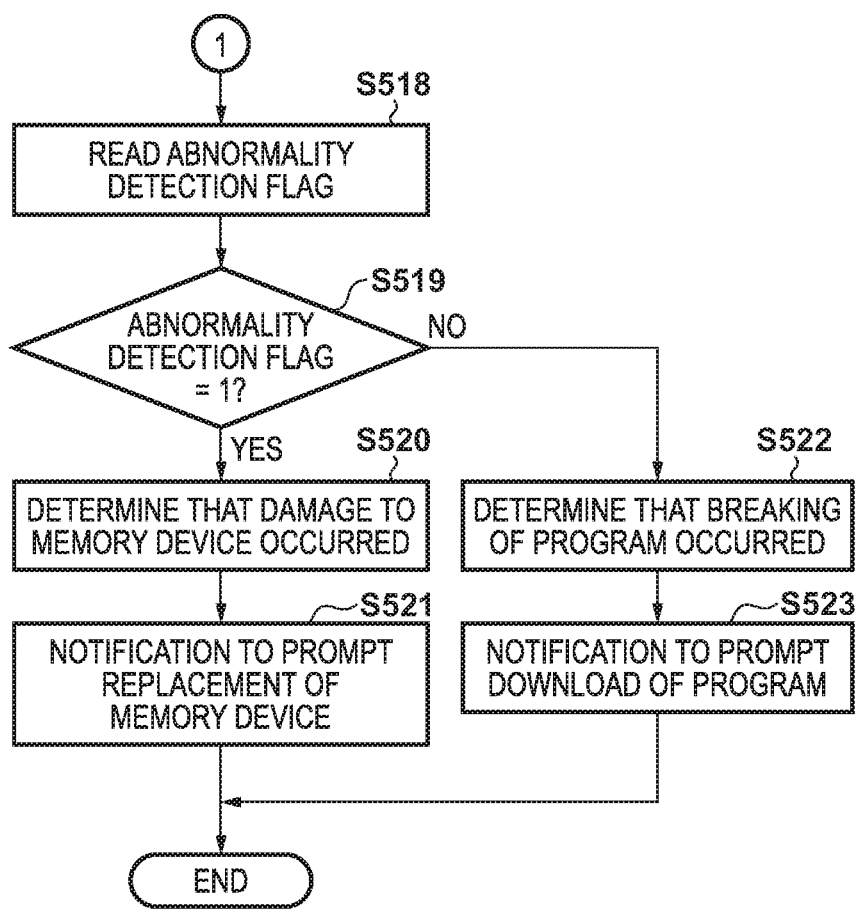

FIGS. 5A and 5B are flowcharts illustrating a procedure of a process for determining the cause of a malfunction in activation control, which is executed by the CPU 102 according to the present embodiment. The processes of the respective steps in FIGS. 5A and 5B are realized by the CPU 102 executing a program stored in the ROM 107 (or the memory device 113, or loaded into the RAM 106 from the ROM 107 or the memory device 113).

In the present embodiment, in addition to the above-described determination of the malfunction related to the memory device 113, the determination of an error based on a boot program of the ROM 107 or a program of the memory device 113 is also performed. In the present embodiment, individual error notifications are performed for such errors. An error that can be determined based on the boot program of the ROM 107 is, for example, an error in the memory device 113 or the UI 108 (i.e., an error in which control is initiated by the boot program but communication with the device is not possible). An error that can be determined by a program of the memory device 113 is, for example, an error of a device such as the printer 109, the scanner 110, or the external I/F 111 (i.e., an error in which control is initiated by the program but communication with the device is not possible). When it is impossible to determine the error based on the above respective program and the activation control is stopped, the CPU 102 determines that a malfunction related to the memory device 113 has occurred.

First, when the power supply of the image forming apparatus 100 is turned on in step S501, the set signal outputted from the reset circuit 125 is switched from the low level to the high level after a predetermined period of time has elapsed, and the reset state of the CPU 102 is released.

In response to the release of the reset state, the CPU 102 initiates, in step S502 execution of the boot program stored in the ROM 107 (BIOS boot). Next, in step S503, the CPU 102 initiates communication by the SATA I/F 112 with the memory device 113. In step S504, the CPU 102 determines whether or not the communication with the memory device 113 is possible, and if communication with the memory device 113 is not possible ("NO" in step S504), advances the processing to step S515. In step S515, the CPU 102 makes a determination that a communication error with the memory device 113 occurs, performs an error notification, and terminates the processing. Incidentally, the error notification is performed by, for example, displaying the error on the UI 108, lighting an LED, or the like.

On the other hand, when the CPU 102 can communicate with the memory device 113 ("YES" in step S504), the CPU 102 advances the process to step S505, and reads out an activation control in progress flag from the memory device 113. The CPU 102 determines whether or not the activation control in progress flag is set to "1", and if the activation control in progress flag is set to "0" ("NO" in step S506), advances the process to step S507. On the other hand, when the activation control in progress flag is set to "1" ("YES" in step S506), the CPU 102 advances the process to step S518.

In step S507, the CPU 102 sets the activation control in progress flag stored in the memory device 113 to "1" indicating that the activation control is being executed. Next, in step S508, an enable signal supplied to the timer 124 is set to ON, thereby causing the timer 124 to start. The timer-count of the timer 124 is cleared when the CPU 102 is put in the reset state by the reset circuit 125.

Thereafter, the CPU 102 loads a program stored in the memory device 113 (the activation program) into a RAM 106 in step S509, and starts executing the program in step S510, thereby starting the control to activate the image forming apparatus 100. In this activation control, the CPU 102 performs a process for initializing the printer 109, the scanner 110, the external I/F 111, and the like.

If any error (such as a communication error) is detected while the activation control is being executed ("YES" in step S511), the CPU 102 advances the processing to step S516. Next, in step S516, the CPU 102 sets the enable signal supplied to the timer 124 to OFF, thereby causing the timer 124 to stop. Further, in step S517, the CPU 102 notifies the content of the detected error by using the UI 108, and then ends the process.

Meanwhile, when no error is detected during the execution of the activation control ("NO" in step S511), the CPU 102 advances the process to step S512. When the activation control based on the program read from the memory device 113 is completed ("YES" in step S512), the CPU 102 advances the process to step S513. Next, in step S513, the CPU 102 sets the enable signal supplied to the timer 124 to OFF, thereby causing the timer 124 to stop. Furthermore, in step S514, the CPU 102 sets the activation control in progress flag stored in the memory device 113 to "0" indicating that the activation control is not being executed, and ends the processing (completes the activation of the image forming apparatus 100).

When the process proceeds from step S506 to step S518 (when the activation control in progress flag is set to "1"), in step S518, the CPU 102 reads out the abnormality detection flag from the SMART information 121 stored in the memory device 113. In step S519, the CPU 102 determines whether or not the read abnormality detection flag is set to "1". When the abnormality detection flag is set to "1" ("YES" in step S519), the CPU 102 advances the processing to step S520, and when the abnormality detection flag is set to "0" ("NO" in step S519), the CPU 102 advances the processing to step S522.

In step S520, the CPU 102 determines that the memory device 113 has been physically damaged. Furthermore, in step S521, CPU 102 uses the UI 108 to make a notification for prompting the user to replace the memory device 113, and ends the process. On the other hand, in step S522, the CPU 102 determines that the program stored in the memory device 113 is broken. Furthermore, in step S523, CPU 102 uses the UI 108 to make a notification for prompting the downloading of the program, and ends the process. In this manner, based on whether or not an abnormality of the management information 119 is detected in the memory device 113 after the reactivation of the image forming apparatus 100, the CPU 102 executes different processing as processing for resolving a malfunction in which the activation of the image forming apparatus 100 stops part way through.

In the present embodiment, when a notification prompting downloading of the program is made, the CPU 102 downloads the program from an external device in accordance with an instruction from the user. Furthermore, the CPU 102 stores the downloaded program in the memory device 113 (the NAND flash memory 120).

As described above, according to the procedure described above, the CPU 102 determines that the reboot was performed during execution of the activation control when the power of the image forming apparatus 100 is turned on, based on the activation control in progress flag. In addition, the CPU 102 determines the cause of the malfunction of the activation control based on the abnormality detection flag.

When the downloading of the program is completed in accordance with the notification of step S523, the activation control in progress flag is set to "0" (cleared). In addition, in the memory device 113 after the replacement according to the notification of step S521, it is assumed that a program other than a later-described program for downloading is not stored in advance, or even when a program is stored, that the region of the storage destination of the activation control in progress flag has been cleared. In the present embodiment, the activation control in progress flag is stored in the memory device 113, but the activation control in progress flag may be stored in another nonvolatile memory device such as the ROM 107 or a hard disk drive (HDD) (not illustrated).

<Activation Control Flow (Normal)>

Figure 6:
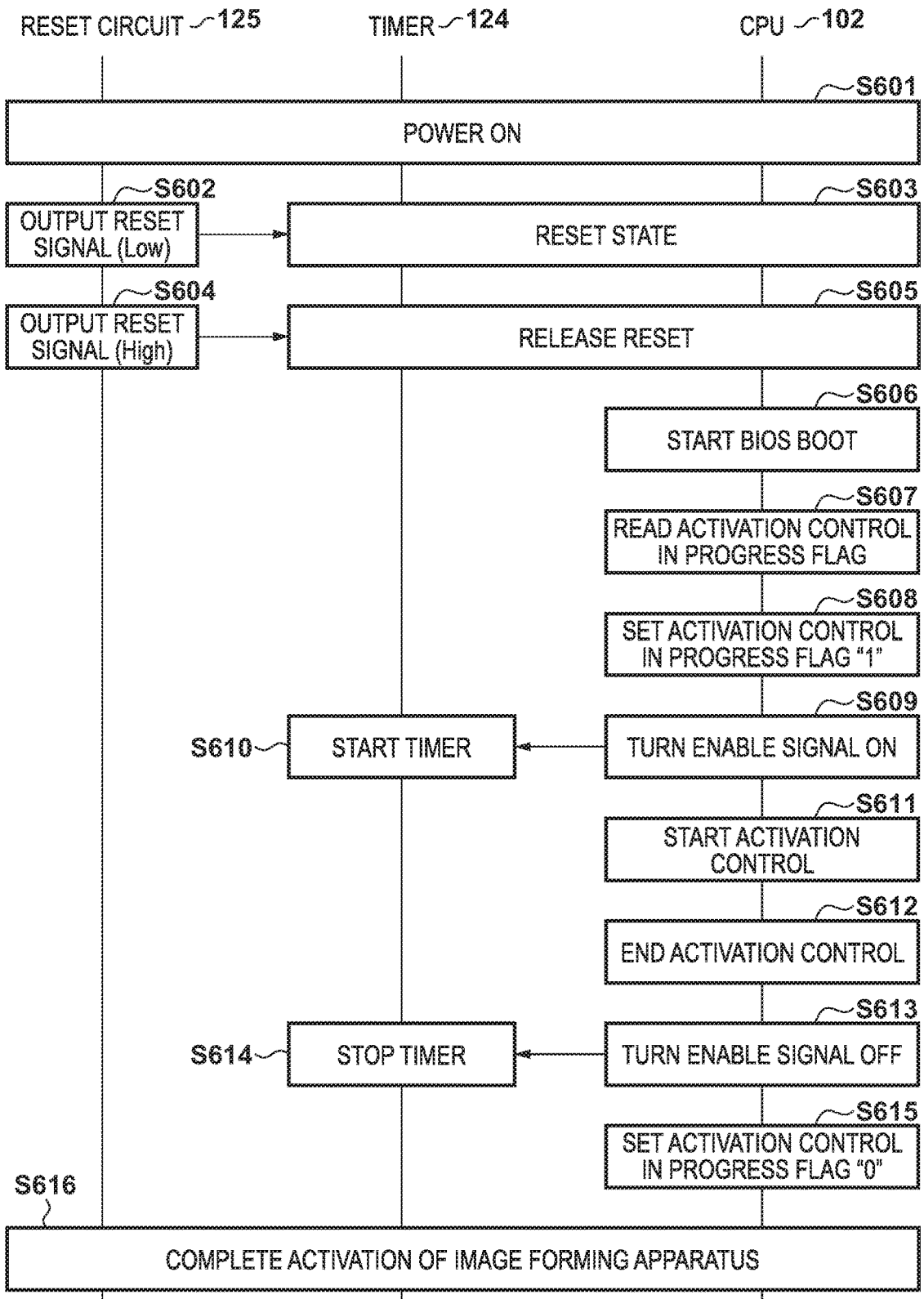
FIG. 6 is a sequence diagram illustrating a flow of activation control of the image forming apparatus.

FIG. 6 is a sequence diagram illustrating a flow of control for activating the image forming apparatus 100 according to the present embodiment, and illustrates a process performed by the CPU 102, the timer 124, and the reset circuit 125 in a case where the activation control is completed normally. It should be noted that the processing by the CPU 102 only illustrates processes related to the timer 124 and the reset circuit 125 among the processes illustrated in FIGS. 5A and 5B.

When the power of the image forming apparatus 100 is turned on (step S601), the reset circuit 125 outputs a low-level reset signal (step S602). This causes the timer 124 and the CPU 102 to enter the reset state (step S603). Thereafter, when a predetermined period has elapsed, the reset signal outputted from the reset circuit 125 is switched from the low level to the high level (step S604). This causes the reset state of the timer 124 and the CPU 102 to be cancelled (step S605).

When the reset state is released, the CPU 102 starts executing the boot program stored in the ROM 107 (step S606). Further, the CPU 102 reads the activation control in progress flag from the memory device 113, confirms that the activation control is not being executed (the activation control in progress flag=0) (step S607), and then sets the activation control in progress flag stored in the memory device 113 to "1" (step S608).

Thereafter, the CPU 102 sets the enable signal provided to the timer 124 to ON (step S609). This causes timer 124 to start (step S610). Furthermore, the CPU 102 starts the control for activating the image forming apparatus 100 based on a program (activation program) loaded into in the RAM 106 from the memory device 113 (step S611). When the program activation control is completed normally (step S612), the CPU 102 set the enable signal supplied to the timer 124 to OFF (step S613). This causes timer 124 to stop (step S614). Finally, the CPU 102 sets (clears) the activation control in progress flag stored in the memory device 113 to "0" (step S615), thereby completing the activation of the image forming apparatus 100 (step S616).

<Activation Control Flow (Abnormal)>

Figure 7:
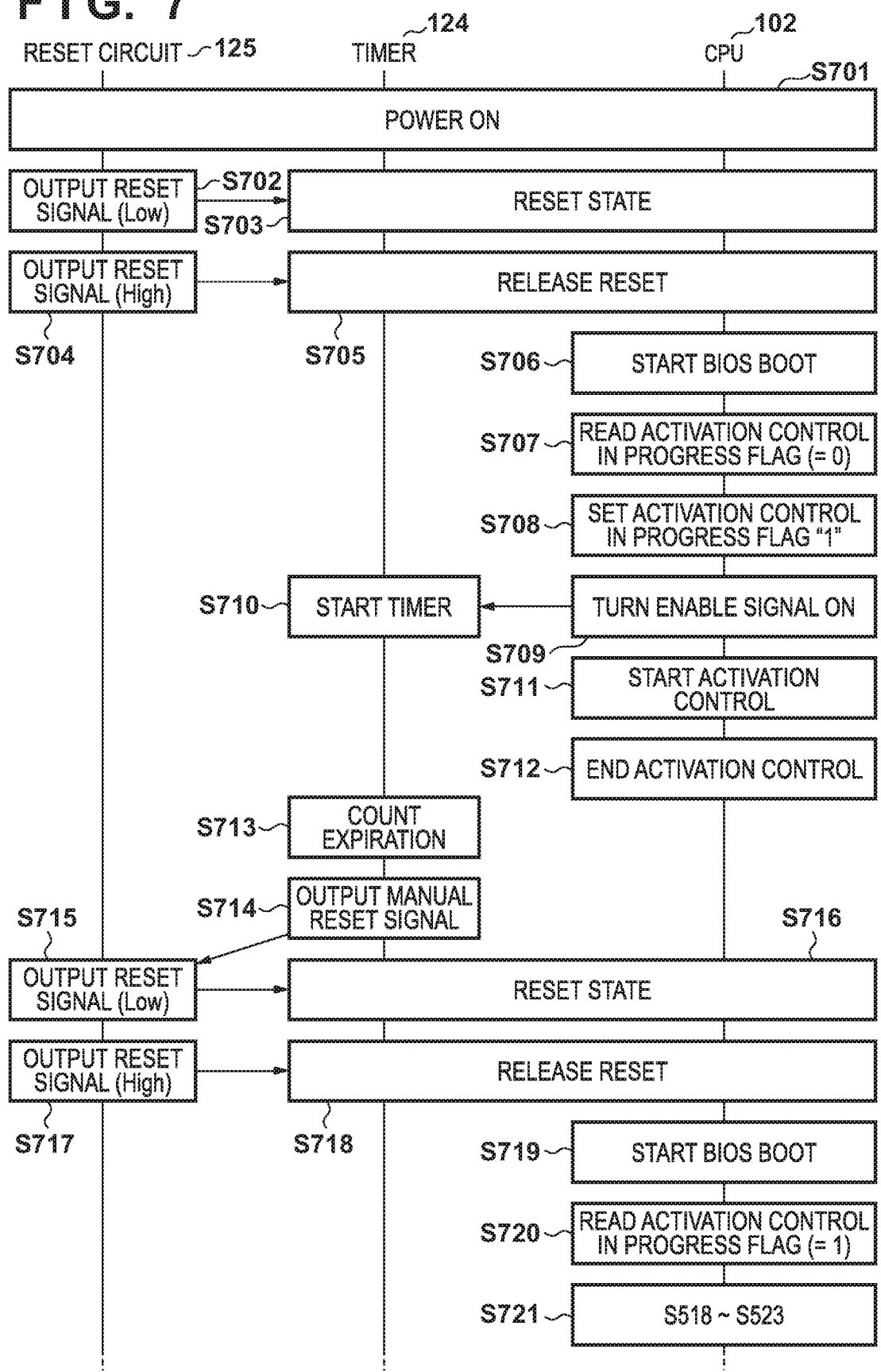
FIG. 7 is a sequence diagram illustrating a flow of activation control of the image forming apparatus.

FIG. 7 is a sequence diagram illustrating a flow of control for activating the image forming apparatus 100 according to the present embodiment, and illustrates a process performed by the CPU 102, the timer 124, and the reset circuit 125 in a case where the activation control is stopped part way through. It should be noted that the processing by the CPU 102 only illustrates processes related to the timer 124 and the reset circuit 125 among the processes illustrated in FIGS. 5A and 5B.

The processing of step S701 to step S711 is the same as the processing of step S601 to step S611 in FIG. 6, and therefore the explanation thereof is omitted. In this example, after the CPU 102 starts the control for activating the image forming apparatus 100 based on a program (activation program) loaded into the RAM 106 from the memory device 113 (step S711), the activation control is stopped part way through due to a cause related to the memory device 113. In this instance, the timer 124 is not stopped by the CPU 102. Therefore, the timer 124 outputs a manual reset signal to the reset circuit 125 (step S714) when it times out (step S713) by continuing the timer-count until a predetermined count value is reached.

The reset circuit 125, upon receiving a manual reset signal, outputs a low-level reset signal (step S715). As a result, the image forming apparatus 100 is rebooted by performing the same processing as in step S702 to step S706 in step S715 to step S719. The CPU 102 starts executing the boot program stored in the ROM 107 (step S719), and reads the activation control in progress flag from the memory device 113. At this time, the activation control in progress flag is set to "1" indicating that the activation control is being executed. In a case where it is confirmed that the activation control in progress flag is set to "1", the CPU 102 determines that the reboot has been performed during execution of the activation control when the power of the image forming apparatus 100 is turned on, and executes the processing of step S518 to step S523. Thus, the CPU 102 determines the cause of the malfunction in the activation control of the image forming apparatus 100, (the malfunction related to the memory device 113).

Thus, in the image forming apparatus 100 according to the present embodiment, in a case where the activation control by the CPU 102 stopped, a reboot using the timer 124 and the reset circuit 125 is performed. In this manner, the CPU 102 determines, based on the activation control in progress flag, that the reboot has been performed while the activation control is being performed when the power of the image forming apparatus 100 is turned on. Further, when it is determined that the reboot has been performed while the activation control is being executed, the CPU 102 determines the cause of the malfunction of the activation control based on the abnormality detection flag.

<Download Mode>

In the present embodiment, when it is determined that the program is broken, the CPU 102 may prompt a serviceperson or user to download the program as in step S523 of FIG. 5B described above. For example, the CPU 102 displays an operation screen as illustrated in FIG. 8 on the UI 108, and prompts the user to make an instruction to transition to the download mode. The download mode is an operation mode in which the user data 123 stored in the memory device 113 executes a program for downloading that is included in advance in addition to the activation program of the image forming apparatus 100. It should be noted that the present invention is not limited to the display of such an operation screen, and other notification methods such as lighting of an LED may be used.

The instruction to transition to the download mode may be performed by, for example, a specific operation by a serviceperson or the user. For example, a service person or a user may operate the power switch of the image forming apparatus 100 while touching a predetermined part on the touch panel of the UI 108 or pressing a predetermined hard key, to issue the instruction to transition to the download mode. In this case, the power of the image forming apparatus 100 needs to be first turned off. The operation method for instructing the transition to the download mode may be known in advance by the serviceperson or the user, or such an operation method may be displayed on an operation screen as illustrated in FIG. 8.

When the image forming apparatus 100 is powered on, the CPU 102 executes a boot program stored in the ROM 107 to detect an instruction to transition to the download mode as described above. When the transition instruction is detected, the CPU 102 loads the program for downloading from the memory device 113 into the RAM 118 and executes the program for downloading. The program for downloading is not a program updated by the download of the program, but a program written in advance in the memory device 113. This is to prevent the program for downloading from being affected even if the image forming apparatus 100 is abnormally powered off during the execution of the software upgrade as described above. As a result, even if an abnormal power-off occurs, the program for downloading is not broken, and the program for downloading can be executed the CPU 102 by the above-described specific operation.

When the CPU 102 executes (activates) the program for downloading, the program is downloaded via the external I/F 111. The external device from which the program is downloaded may be, for example, a USB memory connected to an external I/F 111 via a USB connection, a non-volatile storage device such as an HDD or an SSD, or a server apparatus capable of communicating via a wired LAN or a wireless LAN. In addition, the CPU 102 may execute the program for downloading to display an operation screen on the UI 108 on which the service person or the user can select the external device to be the download source, and the CPU 102 may accept the selection from the service person or the user.

As described above, the image forming apparatus 100 of the present embodiment includes a nonvolatile memory device 113 in which a program for activating the image forming apparatus 100 is stored. The memory device 113 has a function of performing processing for restoring management information when detecting an abnormality in the management information (address conversion table) indicating the correspondence relationship between the logical addresses and the physical addresses of the data stored in the memory device at the time of activation of the memory device. When the power of the image forming apparatus 100 is turned on, the CPU 102 activates the image forming apparatus 100 by executing a program stored in the memory device 113. When the activation of the image forming apparatus 100 based on the program stored in the memory device 113 stops part way through, the timer 124 and the reset circuit 125 reactivates the image forming apparatus. Based on whether or not an abnormality of the management information is detected in the memory device 113 after the reactivation of the image forming apparatus 100, the CPU 102 executes different processing as processing for resolving a malfunction in which the activation of the image forming apparatus 100 stops part way through.

Specifically, when an abnormality in the management information is detected in the memory device 113 after the reactivation of the image forming apparatus 100, the CPU 102 determines that physical damage has occurred to the memory device as a cause of the malfunction. In accordance with the determination result, the CPU 102 performs a notification to prompt replacement of the memory device. Meanwhile, when an abnormality in the management information is detected in the memory device 113 after the reactivation of the image forming apparatus 100, the CPU 102 determines the program stored in the memory device is broken as a cause of the malfunction. According to the determination result, the CPU 102 performs a notification to prompt downloading of the program from the external apparatus. In this manner, since an appropriate notification can prompt a service person or user in accordance with the cause of a malfunction in which the activation of the image forming apparatus 100 stops part way through, it is possible to appropriately deal with the malfunction. Therefore, by virtue of the present embodiment, it is possible to appropriately cope with a malfunction in which the image forming apparatus 100 cannot be activated normally based on a program stored in the memory device 113. This makes it possible for the image forming apparatus 100 to recover at an early stage.

Various modifications can be made to the present embodiment. For example, the CPU 102 may control the memory device 113 to execute a restoration function for restoring the management information when the activation of the image forming apparatus 100 based on the program stored in the memory device 113 is stopped part way through. Further, the CPU 102 may prompt downloading of the program from an external apparatus or download the program from the external apparatus if the memory device 113 does not detect the abnormality of the management information in executing the restoration function based on the activation stoppage. In this instance, the memory device 113 is configured to perform a restoration function at the time of activation, and the CPU 102 is configured to at least reactivate the memory device 113 when the image forming apparatus 100 based on the program activation stops part way through. Therefore, by virtue of this processing, it is possible to appropriately cope with a malfunction in which the image forming apparatus 100 cannot be activated normally based on a program stored in the memory device 113. This makes it possible for the image forming apparatus 100 to recover at an early stage.

Second Embodiment

In the first embodiment, an example has been described in which a notification prompting a service person or a user to download a program is performed in accordance with the determination that the program stored in the memory device 113 has been broken. In this case, in downloading the program, the serviceperson or the user needs to cause the image forming apparatus 100 to operate in the download mode by performing a specific operation after turning off the power of the image forming apparatus 100.

Therefore, in the second embodiment, an example will be described in which the image forming apparatus 100 automatically downloads a program without requiring such a specific operation. In order to simplify the description, descriptions of parts common to the first embodiment are omitted.

In the present embodiment, in the sequence illustrated in FIGS. 5A and 5B, when the abnormality detection flag is set to "0" ("NO" in step S519), the CPU 102 loads the program for downloading from the memory device 113 to the RAM 106 in step S523. Further, by executing the loaded program, the CPU 102 downloads the program from the external device via the external I/F 111, and ends the process. It should be noted that the CPU 102 may display an operation screen on the UI 108 to notify that the program is to be downloaded in step S523.

As described above, in the present embodiment, when it is determined that the program stored in the memory device 113 is broken, the CPU 102 automatically downloads the program from the external device. This makes it possible to solve a malfunction where control to activate the image forming apparatus 100 is stopped due to the program stored in the memory device 113 being broken, without requiring a specific operation by the serviceperson or the user.

Third Embodiment

In the first and second embodiments, an example in which the program is downloaded from an external device in accordance with the determination that the program stored in the memory device 113 is broken has been described. In this case, if the malfunction associated with the memory device 113 cannot be solved even by downloading the program, the activation control will stop again, a reboot will be performed, and the program will be downloaded again.

Accordingly, in the third embodiment, an example in which the program is prevented from being repeatedly downloaded from the external device when a malfunction associated with the memory device 113 cannot be solved will be described. Note that in order to simplify the description, descriptions of parts common to the first embodiment are omitted.

The management information 119 held in the RAM 118 of the memory device 113 includes information other than the address conversion table described in the first embodiment. The information included in the management information 119 differs depending on the manufacturer or type of the memory device 113. For example, an effective page count indicating the number of effective pages in each memory block is included in the management information 119. Unlike the address conversion table, when the memory device 113 is powered on, no abnormality is detected for the effective page count, and even if an abnormality occurs, restoration is not possible. However, when an abnormality occurs in the effective page count, it may become the cause of the control to activate the image forming apparatus 100 being stopped.

When physical damage occurs in a region of the storage area of the RAM 118 in which a valid page count included in the management information 119 is stored, the activation control is stopped but no abnormality in the management information is detected ("NO" in step S519). As a result, the CPU 102 determines that the program stored in the memory device 113 is broken even though the RAM 118 in the memory device 113 is physically damaged.

Therefore, in the present embodiment, the CPU 102 determines that there is no abnormality in the management information, and stores information indicating that the program has been downloaded when the program has been downloaded (step S519 to step S523). This information is stored in the NAND flash memory 120 or the ROM 107.

Thereafter, when it is determined that there is no abnormality in the management information ("NO" in step S519), the CPU 102 determines whether or not the program has been downloaded based on the stored information. If the program has already been downloaded, the CPU 102 determines that a malfunction that cannot be resolved by downloading the program has occurred (i.e., the memory device 113 is physically damaged). Similarly to in step S521, CPU 102, in accordance with this determination result, uses the UI 108 to make a notification for prompting the replacement of the memory device 113, and ends the process.

In this manner, when a program is downloaded from an external device, the CPU 102 stores information indicating that the program has already been downloaded. As a result, the CPU 102 does not repeatedly download a program when the image forming apparatus 100 is reactivated again.

By virtue of the present embodiment, when a malfunction associated with the memory device 113 cannot be solved by downloading a program, it is determined that the memory device 113 is physically damaged, and processing according to the determination result is performed. This makes it possible to prevent the program from being repeatedly downloaded from the external device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-073077, filed Apr. 5, 2019, which is hereby incorporated by reference herein in its entirety.

What is claimed is:

1. An information processing apparatus, comprising:
a nonvolatile memory device in which a program for activating the information processing apparatus is stored, the memory device having a function of, in a case where an abnormality of management information indicating a correspondence relationship between a logical address and a physical address for data stored in the memory device is detected at a time of activation of the memory device, performing a process of restoring the management information;
a reactivation circuit that, in a case where activation of the information processing apparatus based on the program stops part way through, reactivates the information processing apparatus;
one or more memories storing instructions; and
one or more processors that execute the instructions to execute a first process for solving a malfunction in which activation of the information processing apparatus stops part way through due to the memory device being physically damaged, in accordance with an abnormality of the management information being detected in the memory device after execution of the function and the reactivation by the reactivation circuit, and execute a second process for solving the malfunction in which activation of the information processing apparatus stops part way through due to the program stored in the memory device being broken, in accordance with the abnormality of the management information not being detected in the memory device after execution of the function and the reactivation by the reactivation circuit.

2. The information processing apparatus according to claim 1, wherein
the memory device stores detection information indicating whether or not an abnormality of the management information is detected when the memory device is activated, and
the one or more processors execute the instructions to determine whether or not an abnormality of the management information is detected after the execution of the function and the reactivation by referring to the detection information stored in the memory device.

3. The information processing apparatus according to claim 1, wherein
the memory device records, in SMART information stored in the memory device, detection information indicating whether or not an abnormality of the management information is detected, and
the one or more processors execute the instructions to determine whether or not an abnormality of the management information is detected after the execution of the function and the reactivation by referring to the detection information recorded in the SMART information.

4. The information processing apparatus according to claim 1, wherein
in a case where an abnormality of the management information is detected in the memory device after the execution of the function and the reactivation, the one or more processors execute the first process by making a notification to prompt replacement of the memory device, and
in a case where an abnormality of the management information is not detected in the memory device after the execution of the function and the reactivation, the one or more processors execute the second process by making a notification to prompt downloading of the program from an external apparatus.

5. The information processing apparatus according to claim 1, wherein
the one or more processors execute the instructions to determine a cause of the malfunction based on whether or not an abnormality of the management information is detected after the execution of the function and the reactivation of the information processing apparatus, and execute the first process or the second process according to a result of the determination.

6. The information processing apparatus according to claim 5, wherein
in a case where an abnormality of the management information is detected after the execution of the function and the reactivation, the one or more processors execute the instructions to determine that the memory device has been physically damaged as the cause of the malfunction, and
in a case where an abnormality of the management information is not detected after the execution of the function and the reactivation, the one or more processors execute the instructions to determine that a program stored in the memory device has been broken as the cause of the malfunction.

7. The information processing apparatus according to claim 6, wherein
in a case where it is determined that the memory device has been physically damaged, the one or more processors execute the first process by making a notification to prompt replacement of the memory device, and
in a case where it is determined that the program stored in the memory device has been broken, the one or more processors execute the second process by making a notification to prompt downloading of the program from an external apparatus.

8. The information processing apparatus according to claim 7, wherein
in a case where it is determined that the program stored in the memory device has been broken, the one or more processors execute the instructions to download the program from the external apparatus in accordance with an instruction from a user, and store the downloaded program in the memory device.

9. The information processing apparatus according to claim 6, wherein
in a case where it is determined that the program stored in the memory device has been broken, the one or more processors execute the second process by automatically starting downloading of the program from an external apparatus, and storing the downloaded program in the memory device.

10. The information processing apparatus according to claim 7, wherein
the one or more processors execute the instructions to, in a case where the program has been downloaded from the external apparatus, store information indicating that the program has been downloaded, so as to prevent the program from being downloaded repeatedly in a case where the reactivation by the reactivation circuit is performed again.

11. The information processing apparatus according to claim 10, wherein
the one or more processors execute the instructions to, in a case where the reactivation by the reactivation circuit is performed again after the program is downloaded from the external apparatus, determine that the memory device has been physically damaged even if no abnormality of the management information is detected after the reactivation.

12. The information processing apparatus according to claim 1, wherein
the one or more processors execute the instructions to activate the information processing apparatus by executing the program stored in the memory device, and
in a case where, after activation of the information processing apparatus based on the program is started, a predetermined time elapses without activation of the information processing apparatus completing, the reactivation circuit reactivates the information processing apparatus.

13. A method of controlling an information processing apparatus that comprises a nonvolatile memory device in which a program for activating the information processing apparatus is stored, the memory device having a function of, in a case where an abnormality of management information indicating a correspondence relationship between a logical address and a physical address for data stored in the memory device is detected at a time of activation of the memory device, performing a process of restoring the management information, the method comprising:
in a case where activation of the information processing apparatus based on the program stops part way through, reactivating the information processing apparatus; and
executing a first process for solving a malfunction in which activation of the information processing apparatus stops part way through due to the memory device being physically damaged, in accordance with, an abnormality of the management information being detected in the memory device after execution of the function and the reactivation, and executing a second process for solving the malfunction in which activation of the information processing apparatus stops part way through due to the program stored in the memory device being broken, in accordance with the abnormality of the management information not being detected in the memory device after execution of the function and the reactivation.

\* \* \* \* \*